Apr. 17, 1923.
L. A. SHORT
MEAT TENDERING MACHINE
Filed March 15, 1921
1,452,098
2 Sheets-Sheet 2

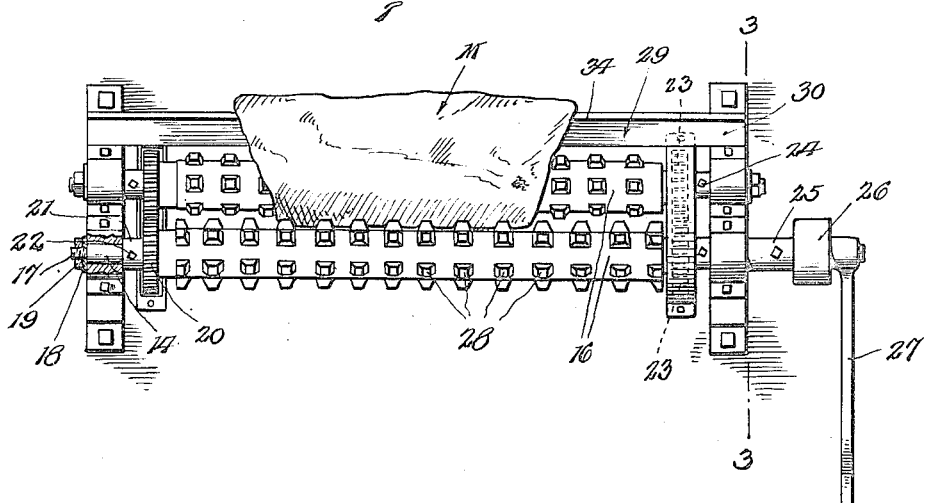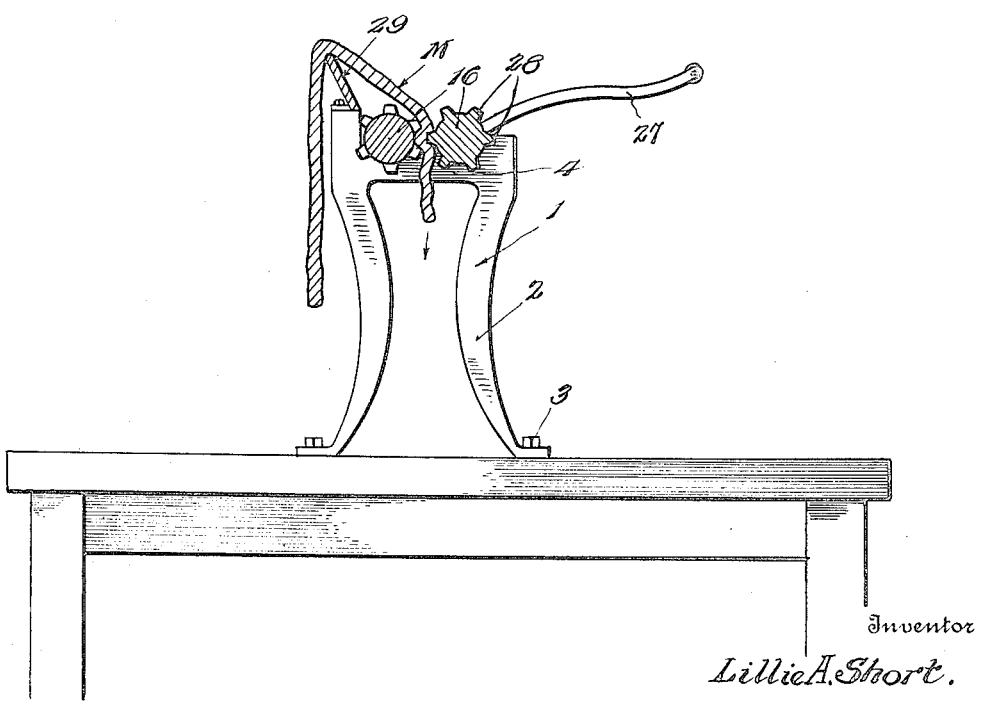

Inventor
Lillie A. Short.
By Lacey & Lacey, Attorneys

Patented Apr. 17, 1923.

1,452,098

UNITED STATES PATENT OFFICE.

LILLIE A. SHORT, OF WASHINGTON, DISTRICT OF COLUMBIA.

MEAT-TENDERING MACHINE.

Application filed March 15, 1921. Serial No. 452,493.

*To all whom it may concern:*

Be it known that I, LILLIE A. SHORT, a citizen of the United States, residing at Washington, in the District of Columbia, have invented certain new and useful Improvements in Meat-Tendering Machines, of which the following is a specification.

This invention relates to improvements in meat tendering machines.

In that type of meat tendering machines embodying coacting tendering rolls, the rolls are ordinarily mounted in bearings located a fixed distance apart so that the peripheral surfaces of the rolls are spaced apart a predetermined distance which cannot be varied under any circumstances. However it is desirable that the rolls be mounted in such manner that they may be relatively adjusted so as to increase or decrease the width of the space between the peripheral surfaces of the rolls and thus adapt the machine for use under different conditions. It is therefore one of the primary objects of the present invention to provide a novel means for journaling the rolls of a meat tendering machine of the class mentioned and which journaling means will be so constructed as to permit of the rolls being spaced apart a greater or less distance and thus be adapted for the passage between them of cuts of meat of different thicknesses.

In the use of the ordinary meat tendering machine the cut of meat to be tendered is ordinarily held suspended by one hand while the tendering rolls are rotated to feed the cut of meat between them and act upon the same. This is not a convenient method of procedure however for the cut of meat may be relatively wide and will therefore fold or sag so that it will pass in this condition between the rolls instead of in a flat or spread out condition and as a result will be lacerated or mangled or become clogged or wedged between the rolls. Therefore it is another important object of the invention to provide means for supporting the cut of meat in a spread out condition while it is being fed between the rolls so that the operation of the machine will be facilitated and the cut will not be torn or mangled and thus rendered unsightly in appearance.

In the accompanying drawings:

Figure 1 is a top plan view of a meat tendering machine constructed in accordance with the invention;

Figure 2 is a vertical transverse sectional view therethrough;

Figure 3:
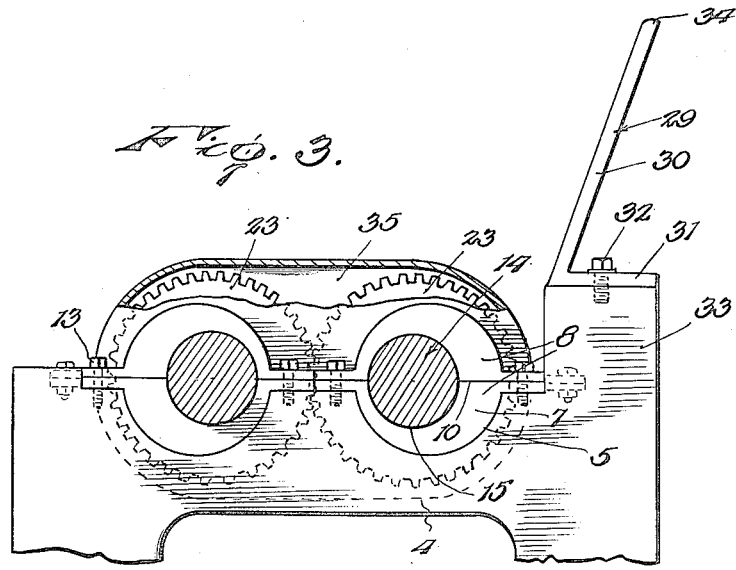
Figure 3 is a detail vertical front to rear sectional view on the line 3—3 of Figure 1 illustrating one adjustment of the bearings for the roll trunnions.

The machine embodies spaced uprights which are indicated in general by the numeral 1 and each of which comprises a pair of legs 2 which may be bolted or otherwise secured, as at 3, at their lower ends to a table top or other supporting surface. The legs are connected at their upper ends by a cross piece 4 which cross piece is formed in its upper side with spaced substantially semicylindrical seats indicated by the numeral 5. In front and in rear of each seat 5, the cross member 4 of each upright or standard is formed with a threaded bolt socket indicated by the numeral 6 and these bolt sockets are equidistantly spaced from the ends of the respective seats. The bearings for the journals of the tendering rolls are indicated in general by the numeral 7 and as all are of the same construction, a specific description of one will suffice. Each bearing comprises a pair of sections 8 each of substantially semi-circular form and having an arcuate semi-circular side 9 and a straight or chordal side 10, each section being provided at each end of its chordal face 10 with a laterally projecting attaching lug 11 flush with the said face of the respective section. The sections 8 are to be assembled with their chordal faces in mutual contact and with their attaching lugs 11 overlapped in the manner best shown in Figures 3 and 4 of the drawings, and when assembled, one of the sections of each bearing is disposed within the respective side 5, the lugs 11 being apertured, as at 12, for the passage of securing bolts 13 which are fitted through the openings 12 and into the threaded bolt sockets 6. In order to receive the roll journals which are indicated by the numeral 14, the sections 8 of each bearing are formed in their chordal faces with semi-circular recesses 15 which match when the sections are assembled. The recesses 15 are offset with relation to the centers of the sections 8 so that the bearing opening afforded by the matching recesses 15 is eccentric to the peripheral face 9 of the bearing as a whole. It will now be evident that the bearing opening of each bearing 7 is located nearer one of the securing means for the bearing than the other. It will also be evident that the bearings are reversible end for end or capable of being inverted by loosening and removing the bolts 13 and after such reversal or inversion, are adapted to be reseated in the seats 5 and again secured in place by the bolts. When the bearings 7 are disposed in the position shown in Figure 3 of the drawings their bearing openings 15 will be located relatively close together as the adjacent ends of the bearings are the ends nearer which the bearing openings are located. However due to the eccentric location of these bearing openings, when the bearings are arranged in the manner shown in Figure 4, the other ends of the bearings or in other words the ends which are the more remote from the bearing openings 15, will be located next to each other and therefore the bearing openings 15 will be spaced apart a greater distance than in Figure 3.

The tendering rolls are indicated by the numeral 16, and the journals 14 for these rolls are in the nature of trunnions of reduced diameter having in turn reduced threaded ends 17 on to which are fitted washers 18 and nuts 19 designed to coact with the bearings 7 to prevent longitudinal displacement of the said rolls 16. One trunnion 14 of each roll has fitted thereon a gear 20 having a collar extension 21 through which is fitted a set screw 22 binding the said trunnion, the gears 20 being in this manner removably secured upon the said ends of the rolls. Similar gears 23 are fitted upon the other ends of the rolls and secured by means of set screws 24, and one of the roll trunnions is extended laterally beyond the respective upright or standard 1, and removably secured thereon is a sleeve 25 carrying a pulley 26 through the medium of which and a suitable belt (not shown) power may be applied to the rolls to rotate the same, rotation of one roll resulting in rotation of the other roll through the medium of the intermeshing gears 20 and 23. A crank handle 27 is likewise removably secured upon the reduced outer end of the trunnion 25 so that the machine may be driven by hand.

The tendering rolls 16 are provided with peripheral series of teeth 28 which may be of any desired form but preferably of the frusto-pyramidal form shown in the drawings. It will now be understood that when the bearings 8 are adjusted in the manner shown in Figure 3, the peripheral surfaces of the rolls 16 will be located relatively close together but should it be desired to increase this space, the gears 20 and 23 may be removed, the bearings 7 reversed or inverted, larger gears secured upon the journals of the rolls, and the rolls again seated in the bearings whereupon by reason of this rearrangement of parts the peripheral surfaces of the rolls will be spaced apart a relatively greater distance than formerly.

The rolls 16 are supported in a horizontal plane and in the use of the machine the cut of meat to be tendered is passed or fed downwardly between the rolls.

Figure 4:
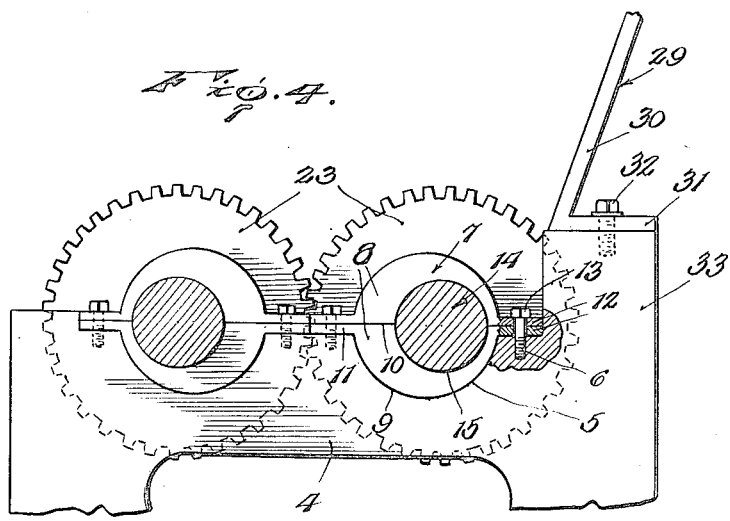
Figure 4 is a similar view illustrating another adjustment of the bearings.
Figure 5:
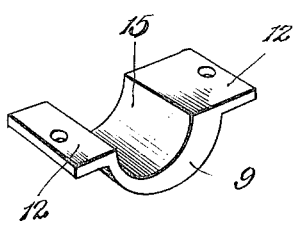
Figure 5 is a perspective view of one section of one of the bearings.

In order that the cut of meat may be maintained or fed in a flat or spread out condition, and without the necessity of manually supporting it in such a position, a supporting ledge is provided and is indicated in general by the numeral 29. This ledge 29 is preferably in the form of a relatively narrow and elongated plate 30 provided at its ends with attaching lugs 31 projecting rearwardly from its lower edge and bolted or otherwise secured, as at 32, to the upper ends of the bosses 33 which project upwardly from the rear sides of the connecting portions 4 of the standards. The plate 30 and attaching lugs 31 occupy planes at an acute angle to each other and inasmuch as the upper ends of the bosses 33 are horizontally disposed, the plate 30 will be inclined upwardly and rearwardly as best shown in Figures 2, 3 and 4 of the drawings. The said plate 30 is located above and rearwardly of the rear roll 16 and is provided with a rounded upper edge 34 parallel to the axis of the said roll. In the manner illustrated in Figures 1 and 2 of the drawings, a cut of meat to be tendered and indicated in general in the drawings by the reference letter M, is laid over the supporting ledge 29 and in a flat or spread out condition and one end of the cut is brought to engagement between the tendering rolls. As the rolls rotate in opposite directions and toward each other, the said cut of meat will be fed downwardly between the rolls and tendered thereby, the cut being drawn over the edge 34 of the supporting ledge 29 and thus automatically maintained in a flattened out condition throughout the tendering operation.

In order to prevent the meat being caught by the gears 20 and 23, guards 35 of any desired or suitable construction may be arranged to more or less completely enclose the said gears.

Having thus described the invention, what is claimed as new is:

1. In a device of the class described, spaced supports each having upper surfaces provided with a pair of equally spaced parallel bearing seats of substantially semi-circular contour, and recesses on each side of the seats and in continuation thereof; a pair of rolls having journals, gears detachably secured on said rolls, a bearing for each journal fitting said seats, a pair of ears on each bearing in diametrically opposite position thereon and adapted to engage in said recesses so as to lie flush with said upper surfaces, said bearings each having a bore adapted to engage a journal and eccentrically located in a diametrical plane running through said ears; said ears having openings and said recesses having correspondingl. threaded apertures, and retaining bolts adapted to engage said openings and apertures to rigidly secure said bearings in axial and perpendicular directions of said seats while said gears are in mesh with each other.

2. In a device of the class described, spaced supports each having upper surfaces provided with a pair of equally spaced parallel bearing seats of substantially semi-circular contour, and recesses on each side of the seats and in continuation thereof; a pair of rolls having journals, gears detachably secured on said rolls, a bearing for each journal fitting said seats, a pair of ears on each bearing in diametrically opposite position thereon and adapted to engage in said recesses so as to lie flush with said upper surfaces, said bearings each having a bore adapted to engage a journal and eccentrically located in a diametrical plane running through said ears; said ears having openings and said recesses having correspondingly threaded apertures, and retaining bolts adapted to engage said openings and apertures to rigidly secure said bearings in axial and perpendicular directions of said seats while said gears are in mesh with each other, each of said bearings being divided along said diametrical plane, thereby providing two symmetrical sections, interchangeable between themselves and in said seats, other gears interchangeable on said rolls with said first gears adapted to mesh after such interchange of bearings in said seats.

3. In a device of the class described, spaced supports each having upper surfaces provided with a pair of equally spaced parallel bearing seats of substantially semicircular contour, and recesses on each side of the seats and in continuation thereof; a pair of rolls having journals, gear wheels detachably mounted on said rolls, a bearing for each roll fitting said seats while said gears are in mesh with each other, a pair of ears on each bearing in diametrically opposite position thereon and adapted to engage in said recesses so as to lie flush with said upper surfaces, said bearings each having a bore adapted to engage a journal and eccentrically located in a diametrical plane running through said ears; said ears having openings and said recesses having correspondingly threaded apertures and retaining bolts adapted to engage said openings and apertures to rigidly secure said bearings in axial and perpendicular directions of said seats whereby, upon reversing said bearings in the seats, said gears will be brought out of mesh, other gears interchangeable on said rolls with said first gears adapted to mesh with each other after such interchange of bearings in said seats.

In testimony whereof I affix my signature.

LILLIE A. SHORT. [L. S.]